(12) United States Patent
Xu et al.

(10) Patent No.: US 10,116,155 B2
(45) Date of Patent: Oct. 30, 2018

(54) BATTERY CHARGING CIRCUIT WITH HIGH CAPACITY, CONTROL CIRCUIT AND ASSOCIATED CONTROL METHOD

(71) Applicant: Chengdu Monolithic Power Systems Co., Ltd., Chengdu (CN)

(72) Inventors: Min Xu, Hangzhou (CN); Qiming Zhao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 48 days.

(21) Appl. No.: 15/387,612

(22) Filed: Dec. 21, 2016

(65) Prior Publication Data

US 2017/0187213 A1  Jun. 29, 2017

(30) Foreign Application Priority Data

Dec. 29, 2015 (CN) .......................... 2015 1 1004862

(51) Int. Cl.
*H02J 7/00* (2006.01)

(52) U.S. Cl.
CPC ............ *H02J 7/0052* (2013.01); *H02J 7/007* (2013.01)

(58) Field of Classification Search
CPC .................................................. H02J 7/0052
USPC ......................................................... 320/164
See application file for complete search history.

(56) References Cited

U.S. PATENT DOCUMENTS

| 9,391,516 | B2 | 7/2016 | Bai |
| 9,431,845 | B2 | 8/2016 | Xu |
| 2015/0102787 | A1 | 4/2015 | Xu |
| 2015/0123480 | A1 | 5/2015 | Xu |
| 2015/0194826 | A1 | 7/2015 | Xu |
| 2017/0085183 | A1* | 3/2017 | Notsch ............... H02M 3/33507 |
| 2017/0187214 | A1* | 6/2017 | Xu ........................ H02M 3/158 |

\* cited by examiner

*Primary Examiner* — M'Baye Diao
(74) *Attorney, Agent, or Firm* — Perkins Coie LLP

(57) ABSTRACT

A battery charging circuit has a first switching circuit and a second switching circuit which are coupled in parallel. A control circuit has a plurality of feedback control loops, a logic integrated circuit, a first logic circuit and a second logic circuit, wherein the plurality of feedback control loops provides a plurality of feedback control signals, the logic integrated circuit provides a logic integrated signal based on the plurality of feedback control signals, the frequency dividing circuit provides a first frequency dividing signal and a second frequency dividing signal based on the logic integrated signal, the first logic circuit controls the first switching circuit based on the first frequency dividing signal and a first duration signal, the second logic circuit controls the second switching circuit based on the second frequency dividing signal and a second duration signal.

20 Claims, 10 Drawing Sheets

BATTERY CHARGING CIRCUIT WITH HIGH CAPACITY, CONTROL CIRCUIT AND ASSOCIATED CONTROL METHOD

This application claims the benefit of CN application No. 201511004862.2, filed on Dec. 29, 2015, and incorporated herein by reference.

TECHNICAL FIELD

The present invention relates to electrical circuit, more particularly but not exclusively relates to battery charging circuit.

BACKGROUND

With the development of portable electronic equipments, battery charging circuits are widely used. With the increasing of functions of the portable electronic equipments, its battery capacity becomes higher and higher in order to guarantee the operation time of the portable electronic equipments. Correspondingly, the charging currents of the batteries also become larger and larger to satisfy the charging time that consumers require. Nevertheless, it's extremely difficult for a battery charging circuit to have both small volume and good thermal performance, or have a large charging current while using an inductance with small volume. Furthermore, to realize the flexible in-out configuration, for instance, to apply the adapters with various standards, a novel battery charging circuit is needed.

SUMMARY

It is one of the objects of the present invention to provide a battery charging circuit with high capacity, control circuit and associated control method.

One embodiment of the present invention discloses a battery charging circuit, having an input terminal configured to receive an input voltage and an outputterminal configured to provide a system voltage, the battery charging circuit comprising: a first switching circuit, having a first terminal and a second terminal, wherein the first switching circuit comprises a first switch, the first terminal of the first switching circuit is coupled to the input terminal of the battery charging circuit, the second terminal of the first switching circuit is coupled to the output terminal of the battery charging circuit; a second switching circuit, comprising a second switch, wherein the second switching circuit and the first switching circuit are coupled in parallel between the input terminal and the output terminal of the battery charging circuit; a plurality of feedback control loops, configured to provide a plurality of feedback control signals, wherein each feedback control loop receives a feedback signal, a ramp signal and a reference signal, wherein the plurality of feedback control signals are configured to turn off one of the first switching circuit and the second switching circuit; a logic integrated circuit, coupled to the plurality of feedback control loops to receive the plurality of feedback control signals, and configured to provide a logic integrated signal based on the plurality of feedback control signals; a frequency dividing circuit, coupled to the logic integrated circuit to receive the logic integrated signal, and configured to divide the logic integrated signal's pulse into two sequences orderly, wherein one sequence is configured to form a first frequency dividing signal, and the other sequence is configured to form a second frequency dividing signal; a first duration control circuit, configured to receive a first duration control signal and configured to provide a first duration signal, wherein the first duration signal is adjustable in real-time; a second duration control circuit, configured to receive a second duration control signal and configured to provide a second duration signal, wherein the second duration signal is adjustable in real-time; a first logic circuit, configured to receive the first frequency dividing signal and the first duration signal, and configured to provide a first switch control signal to control the first switch of the first switching circuit, wherein the first logic circuit is configured to control an off moment of the first switch according to the first frequency dividing signal, and configured to control an off duration of the first switch according to the first duration signal; and a second logic circuit, configured to receive the second frequency dividing signal and the second duration signal, and configured to provide a second switching control signal to control the second switch of the second switching circuit, wherein the second logic circuit is configured to control an off moment of the second switch according to the second frequency dividing signal, and configured to control an off duration of the second switch according to the second duration signal.

Another embodiment of the present invention discloses a control circuit for a battery charging circuit, the battery charging circuit has an input terminal, an output terminal, a first switching circuit and a second switching circuit, wherein the first switching circuit and the second switching circuit are coupled in parallel between the input terminal and the output terminal of the battery charging circuit, the control circuit comprises: a plurality of feedback control loops, configured to provide a plurality of feedback control signals, wherein each feedback control loop receives a feedback signal, a ramp signal and a reference signal, wherein the plurality of feedback control signals are configured to turn off one of the first switching circuit and the second switching circuit; an OR gate, coupled to the plurality of feedback control loops to receive the plurality of feedback control signals, and configured to provide a logic integrated signal based on the plurality of feedback control signals; a frequency dividing circuit, coupled to the OR gate to receive the logic integrated signal and configured to divide the logic integrated signal's pulse into two sequences orderly, wherein one sequence is configured to form a first frequency dividing signal, and the other sequence is configured to form a second frequency dividing signal; a current sharing control loop, configured to receive a first current feedback signal representing a current flowing through the first switching circuit and a second current feedback signal representing a current flowing through the second switching circuit, and configured to produce a first duration control signal and a second duration control signal; a first duration control circuit, configured to receive the first duration control signal and provide a first duration signal, wherein the first duration signal is adjustable in real-time; a second duration control circuit, configured to receive the second duration control signal and provide a second duration signal, wherein the second duration signal is adjustable in real-time; a first logic circuit, configured to receive the first frequency dividing signal and the first duration signal, and configured to provide a first switch control signal to control a first switch of the first switching circuit, wherein the first logic circuit is configured to control an off moment of the first switch according to the first frequency dividing signal, and configured to control an off duration of the first switch according to the first duration signal; and a second logic circuit, configured to receive the second frequency dividing signal and the second duration signal, and configured to provide a second switch control signal to control a second switch of the second switching circuit, wherein the second logic circuit is configured to control an off moment of the second switch according to the second frequency dividing signal, and configured to control an off duration of the second switch according to the second duration signal.

Yet another embodiment of the present invention discloses a control method for a battery charging circuit, the battery charging circuit has an input terminal, an output terminal, a first switching circuit and a second switching circuit, wherein the first switching circuit and the second switching circuit are coupled in parallel between the input terminal and the output terminal of the battery charging circuit, the control method comprising: producing an input current feedback control signal according to an input current feedback signal, a ramp signal and an input current reference signal, wherein the input current feedback signal represents an input current of the battery charging circuit; producing a battery voltage feedback control signal according to a battery voltage feedback signal, the ramp signal and a battery voltage reference signal, wherein the battery voltage feedback signal represents a voltage across a battery; and producing a charging current feedback control signal according to a charging current feedback signal, the ramp signal and a charging current reference signal, wherein the charging current feedback signal represents a battery charging current; producing a system voltage feedback control signal according to a system voltage feedback signal, the ramp signal and a system voltage reference signal, wherein the system voltage feedback signal represents a system voltage provided by the battery charging circuit; producing a logic integrated signal according to the input current feedback control signal, the battery voltage feedback control signal, the charging current feedback control signal and the system voltage feedback control signal; dividing the logic integrated signal's pulse into two sequences orderly, wherein one sequence is configured to form a first frequency dividing signal, and the other sequence is configured to form a second frequency dividing signal; producing a first duration signal and a second duration signal according to a current flowing through the first switching circuit and a current flowing through the second switching circuit; producing a first switching control signal according to the first frequency dividing signal and the first duration signal in order to control the first switching circuit, wherein the first switch control signal is configured to control an off moment of the first switching circuit according to the first frequency dividing signal, and control an off duration of the first switching circuit according to the first duration signal; and producing a second switching control signal according to the second frequency dividing signal and the second duration signal in order to control the second switching circuit, wherein the second switch control signal is configured to control an off moment of the second switching circuit according to the second frequency dividing signal, and control an off duration of the second switching circuit according to the second duration signal; wherein when a difference value of the current flowing through the first switching circuit and the current flowing through the second switching circuit is larger than a presupposed value, the first duration signal is configured to lengthen the off duration of the first switching circuit, and the second duration signal is configured to shorten the off duration of the second switching circuit; and when a difference value of the current flowing through the second switching circuit and the current flowing through the first switching circuit is larger than a presupposed value, the first duration signal is configured to shorten the off duration of the first switching circuit and the second duration signal is configured to lengthen the off duration of the second switching circuit.

According to the embodiments of the present invention, the battery charging circuit has not only a small volume with a large charging current but also a good thermal performance.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are described to provide a thorough understanding of the embodiments of the invention, such as examples of circuits, components, and methods. These embodiments are exemplary, not to confine the scope of the invention. Persons of ordinary skill in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

Figure 1:
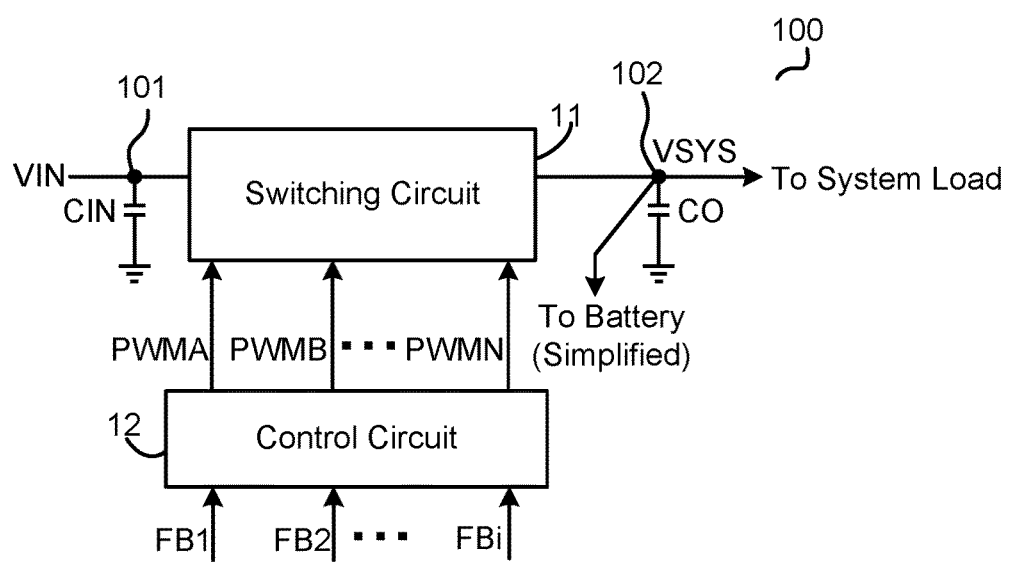
FIG. 1 schematically illustrates a circuit block diagram of a battery charging circuit 100 according to an embodiment of the present invention.

FIG. 1 schematically illustrates a circuit block diagram of a battery charging circuit 100 according to an embodiment of the present invention. In one embodiment as shown in FIG. 1, an input terminal 101 of the battery charging circuit 100 is configured to receive an input voltage VIN and configured to provide a system voltage VSYS via an output terminal 102 of the battery charging circuit 100. The battery charging circuit 100 comprises an input capacitor CIN, an output capacitor CO, a switching circuit 11 and a control circuit 12, wherein the input capacitor CIN is coupled between the input voltage VIN and a reference ground, wherein the output capacitor CO is coupled between the system voltage VSYS and the reference ground. The switching circuit 11 comprises a plurality of switches. In one embodiment, the switching circuit 11 comprises a plurality of switching circuits which are coupled in parallel, i.e. a switching circuit with multi-phase. Each of the switching circuits coupled in parallel comprises at least one switch. There is a phase shift between each switching circuit. And the switching circuits coupled in parallel are configured to be turned on alternately. In another embodiment, the switching circuit 11 can be a step-up circuit, and the switching circuit 11 can also be a step-down circuit. Based on a plurality of feedback signals FB1, FB2 . . . FBi, the control circuit 12 is configured to produce a plurality of switching control signals PWMA, PWMB . . . PWMN to control the plurality of switches in the switching circuit 11 respectively. The plurality of feedback signals FB1, FB2 . . . FBi represent circuitry parameters of the battery charging circuit 100, e.g. an input voltage feedback signal represents the input voltage VIN, and a system voltage feedback signal FBVSYS represents the system voltage VSYS.

Figure 2:
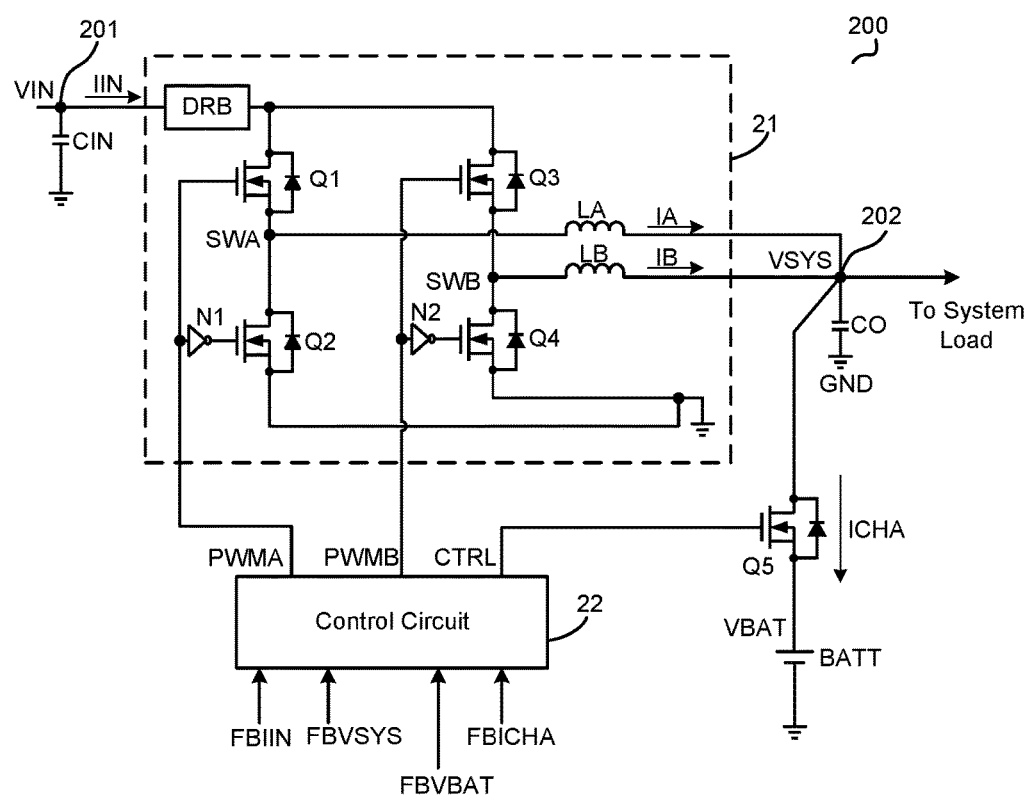
FIG. 2 schematically illustrates a battery charging circuit 200 according to an embodiment of the present invention.

FIG. 2 schematically illustrates a battery charging circuit 200 according to an embodiment of the present invention. A synchronous step-down topology with two-phase is an example to introduce the battery charging circuit 200. However, as the persons of ordinary skill known, the battery charging circuit 200 can be a topology with multi-phase. The switching circuit 21 comprises a first switching circuit and a second switching circuit, wherein the first switching circuit has a switch Q1, a switch Q2 and an inductance LA, and the second switching circuit has a switch Q3, a switch Q4 and an inductance LB. The first switching circuit and the second switching circuit are coupled in parallel between the input terminal 201 and the output terminal 202 of the battery charging circuit 200. A first terminal of the switch Q1 and a first terminal of the switch Q3 are coupled to the input terminal 201 of the battery charging switch 200 via a unidirectional conducting device DRB. The first terminal of the switch Q1 and the first terminal of the switch Q3 are configured to receive the input voltage VIN. A second terminal of the switch Q3 is coupled to a first terminal of the switch Q4. A second terminal of the switch Q4 is coupled to the reference ground. A first terminal of the inductance LA is coupled to a common node SWA of the switch Q1 and the switch Q2. The first terminal of the inductance LA and a second terminal of the inductance LB are coupled to the output terminal 202 of the battery charging circuit 200 to provide the system voltage VSYS across the output capacitor CO. In one embodiment as shown in FIG. 2, when the input terminal 201 of the battery charging circuit 200 is coupled to an input power source to receive the input voltage VIN, the system voltage VSYS is larger than a battery voltage VBAT and configured to charge a battery BATT via a switch Q5, or else when the input terminal 201 of the battery charging circuit 200 is disconnected with the input power source, a battery voltage VBAT is configured to offer the system voltage VSYS for a system load at the output terminal 202 via the switch Q5. The switch Q1, the switch Q2, the switch Q3, the switch Q4 and the switch Q5 can be transistors, e.g. Metal Oxide Semiconductor Field Effect Transistor (MOSFET), Bipolar Junction Transistor (BJT), Junction Field Effect Transistor (JFET), and Insulated Gate Bipolar Transistor (IGBT). In FIG. 2, MOSFET is an example to illustrate the switch Q1, the switch Q2, the switch Q3 and the switch Q4. In other embodiments, the battery charging circuit 200 can comprise asynchronous switching circuits, and the switch Q2 and the switch Q4 can be replaced by diodes.

The control circuit 22 is configured to receive an input current feedback signal FBIIN, the system voltage feedback signal FBVSYS, a battery voltage feedback FBVBAT, and a charging current feedback signal FBICHA, wherein the input current feedback signal FBIIN represents an input current IIN of the battery charging circuit 200, the system voltage feedback signal FBVSYS represents the system voltage VSYS of the battery charging circuit 200, the battery voltage feedback FBVBAT represents the battery voltage VBAT, and the charging current feedback signal FBICHA represents a charging current ICHA of the battery BATT. Subsequently, the battery charging circuit 200 is configured to produce a first control signal PWMA to turn on and off the switch Q1 and the switch Q2 of the first switching circuit, and configured to produce a second control signal PWMB to turn on and off the switch Q3 and the switch Q4 of the second switching circuit, and configured to produce a switching control signal CTRL to turn on and off the switch Q5. In other embodiments, the control circuit 22 can be configured to receive other feedback signals representing other circuitry parameters, e.g. the input voltage feedback signal representing the input voltage VIN, a temperature feedback signal representing a circuit temperature, and so on. Based on the feedback signals, the control circuit 22 is configured to produce the switching control signals PWMA, PWMB and CTRL. In one embodiment, when errors of the battery charging circuit 200 or the battery BATT are detected, the control circuit 22 is configured to turn off the switch Q5 through the switching control signal CTRL.

Figure 3:
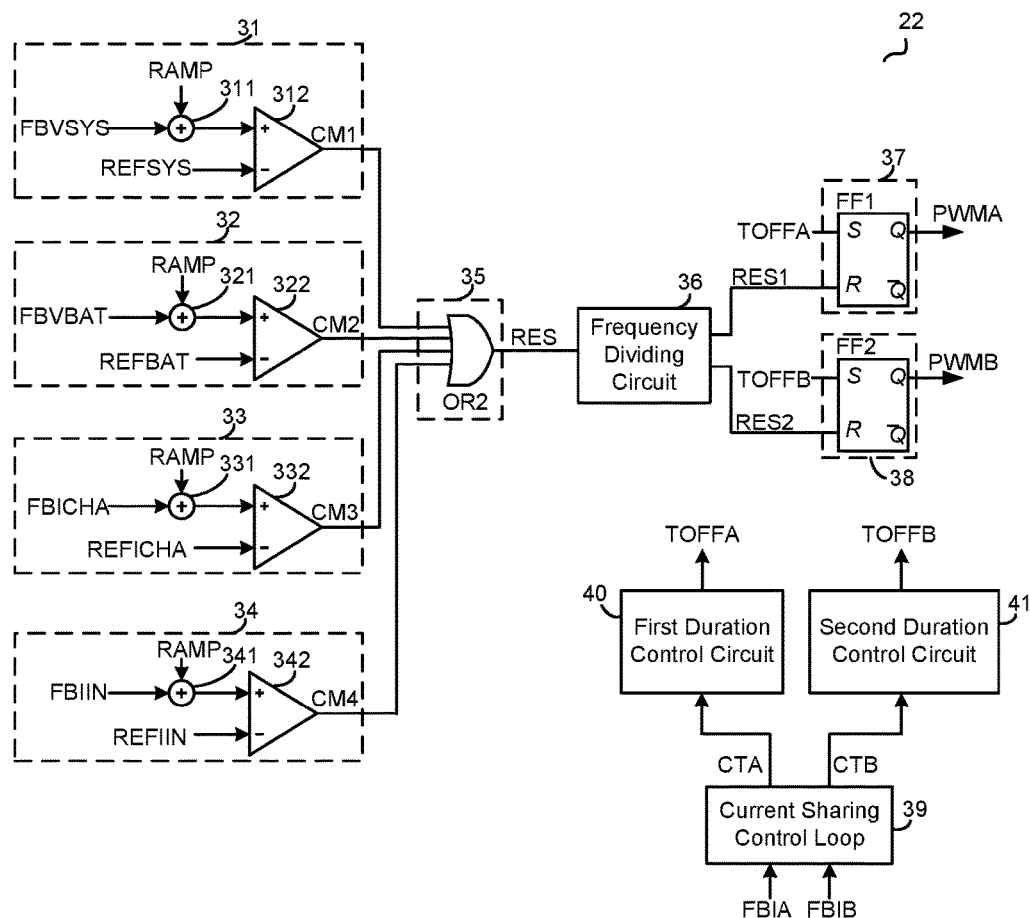
FIG. 3 schematically illustrates a control circuit 22 for the battery charging circuit 200 according to an embodiment of the present invention.

FIG. 3 schematically illustrates a control circuit 22 for the battery charging circuit 200 according to an embodiment of the present invention. The control circuit 22 comprises feedback control loops 31-34, a logic Integrated circuit 35, a frequency dividing circuit 36, a first logic circuit 37 and a second logic circuit 38.

Each of the feedback control loops 31-34 is configured to receive a feedback signal, a ramp signal and a reference signal. Each of the feedback control loops 31-34 is configured to provide a feedback control signal. In one embodiment, each of the feedback control loops 31-34 comprises an operation circuit and a comparison circuit, wherein the operation circuit is configured to provide a feedback operation signal based on the feedback signal and the ramp signal RAMP, wherein the comparison circuit is configured to provide a feedback control signal based on a comparison result of the feedback operation signal and the reference signal.

In one embodiment as shown in FIG. 3, a feedback control loop 31 is a system voltage feedback control loop. It is configured to produce a system voltage feedback control signal CM1 based on a comparison result of a system voltage reference signal REFSYS and a signal (FBVSYS+RAMP), wherein the signal (FBVSYS+RAMP) is superposed by the ramp signal RAMP and the system voltage feedback signal FBVSYS representing the system voltage VSYS of the battery charging circuit 200. For example, the feedback control loop 31 comprises an operation circuit 311 and a comparison circuit 312. Wherein the operation circuit 311 is configured to produce the feedback signal (FBVSYS+

RAMP) after receiving the system voltage feedback signal FBVSYS and the ramp signal RAMP. A non-inverting input terminal of the comparison circuit 312 is coupled to the operation circuit 311, and is configured to receive the feedback signal (FBVSYS+RAMP). An inverting input terminal of the comparison circuit 312 is configured to receive the system voltage reference signal REFSYS. The comparison circuit 312 is configured to provide the system voltage feedback control signal CM1 through its output terminal.

In one embodiment as shown in FIG. 3, a feedback control loop 32 is a battery voltage feedback control loop. It is configured to produce a battery voltage feedback control signal CM2 based on a comparison result of a battery voltage reference signal REFBAT and a signal (FBVBAT+RAMP), wherein the signal (FBVBAT+RAMP) is superposed by the ramp signal RAMP and the battery voltage feedback signal FBVBAT representing the battery voltage VBAT across the battery BATT. For example, the feedback control loop 32 comprises an operation circuit 321 and a comparison circuit 322. Wherein the operation circuit 321 is configured to produce the feedback signal (FBVBAT+RAMP) after receiving the battery voltage feedback signal FBVBAT and the ramp signal RAMP. A non-inverting input terminal of the comparison circuit 322 is coupled to the operation circuit 321, and is configured to receive the feedback operation signal (FBVBAT+RAMP). An inverting input terminal of the comparison circuit 322 is configured to receive the battery voltage reference signal REFBAT. The comparison circuit 322 is configured to provide the battery voltage feedback control signal CM2 through its output terminal.

In one embodiment as shown in FIG. 3, a feedback control loop 33 is a charging circuit feedback control loop. It is configured to produce a charging circuit feedback control signal CM3 based on a comparison result of a charging current reference signal REFICHA and a signal (FBICHA+RAMP), wherein the signal (FBICHA+RAMP) is superposed by the ramp signal RAMP and the charging current feedback signal FBICHA representing the charging current ICHA for the battery BATT. For example, the feedback control loop 33 comprises an operation circuit 331 and a comparison circuit 332. Wherein the operation circuit 331 is configured to produce the feedback signal (FBICHA+RAMP) after receiving the charging current feedback signal FBICHA and the ramp signal RAMP. A non-inverting input terminal of the comparison circuit 332 is coupled to the operation circuit 331, and is configured to receive the feedback operation signal (FBICHA+RAMP). An inverting input terminal of the comparison circuit 332 is configured to receive the charging current reference signal REFICHA. Comparison circuit 332 is configured to provide the charging current feedback control signal CM3 through its output terminal.

In one embodiment as shown in FIG. 3, a feedback control loop 34 is an input circuit feedback control loop. It is configured to produce an input circuit feedback control signal CM4 based on a comparison result of an input current reference signal REFIIN and a signal (FBIIN+RAMP), wherein the signal (FBIIN+RAMP) is superposed by the ramp signal RAMP and the input current feedback signal FBIIN representing the input current IIN of the battery charging circuit 200. For example, the feedback control loop 34 comprises an operation circuit 341 and a comparison circuit 342. Wherein the operation circuit 341 is configured to produce the feedback signal (FBIIN+RAMP) after receiving the input current feedback signal FBIIN and the ramp signal RAMP. A non-inverting input terminal of the comparison circuit 342 is coupled to the operation circuit 341, and is configured to receive the feedback operation signal (FBIIN+RAMP). An inverting input terminal of the comparison circuit 342 is configured to receive the input current reference signal REFIIN. The comparison circuit 342 is configured to provide the input current feedback control signal CM4 through its output terminal.

The logic integrated circuit 35 is coupled to the feedback control loops 31-34 to receive the feedback control signals CM1-CM4, and is configured to provide a logic integrated signal RES based on the feedback control signals CM1-CM4. For example, the logic integrated circuit 35 comprises a second OR gate OR2, wherein a plurality of input terminals of the second OR gate OR2 are configured to receive the feedback control signals CM1-CM4 respectively, and an output terminal of the second OR gate OR2 is configured to output the logic integrated signal RES. In one embodiment, if a sum of the ramp signal RAMP and anyone of the feedback control signals CM1-CM4 is larger than a reference signal, the logic integrated circuit 35 is configured to reflect this phenomena to the logic integrated signal RES, e.g., the logic integrated signal RES is configured to be a high level to turn off one of the first switching circuit and the second switching circuit.

The frequency dividing circuit 36 is coupled to the logic integrated circuit 35 to receive the logic integrated signal RES, and is configured to divide the logic integrated signal's pulse into two sequences orderly, wherein one sequence is configured to form a first frequency dividing signal RES1, and the other sequence is configured to form a second frequency dividing signal RES2.

The first logic circuit 37 is configured to receive the first frequency dividing signal RES1 and a first duration signal TOFFA, and is configured to provide the first switching control signal PWMA to control the switch Q1 and the switch Q2 of the first switching circuit. The second logic circuit 38 is configured to receive the second frequency dividing signal RES2 and a second duration signal TOFFB, and is configured to provide the second switching control signal PWMB to control the switch Q3 and the switch Q4 of the second switching circuit. In one embodiment, the first logic circuit 37 is configured to control an off moment of the switch Q1 according to the first frequency dividing signal RES1, and configured to control an off duration of the switch Q1 according to the first duration signal TOFFA. The second logic circuit 38 is configured to control an off moment of the switch Q3 according to the second frequency dividing signal RES2, and is configured to control an off duration of the switch Q3 according to the second duration signal TOFFB. For example, the first logic circuit 37 comprises an RS trigger circuit FF1. Wherein a set terminal S of the RS trigger circuit FF1 is configured to receive the first duration signal TOFFA. A reset terminal R of the RS trigger circuit FF1 is configured to receive the first frequency dividing signal RES1. An output terminal Q of the RS trigger circuit FF1 is configured to provide the first switching control signal PWMA. For example, the second logic circuit 38 comprises an RS trigger circuit FF2. Wherein a set terminal S of the RS trigger circuit FF2 is configured to receive the second duration signal TOFFB. A reset terminal R of the RS trigger circuit FF2 is configured to receive the second frequency dividing signal RES2. An output terminal Q of the RS trigger circuit FF2 is configured to provide the second switching control signal PWMB. In one embodiment, the off duration of the switch Q1 can be controlled by the first duration signal TOFFA, wherein the first duration signal TOFFA is produced based on a first off duration TA which is set by a program or a circuit. The off duration of the switch Q3 can be controlled by the second duration signal TOFFB, wherein the second duration signal TOFFB is produced based on a second off duration TB which is set by a program or a circuit. In another embodiment, the off duration of the switch Q1 can also be controlled by the first duration signal TOFFA which is produced based on a presupposed frequency, and the off duration of the switch Q3 can also be controlled by the second duration signal TOFFB which is produced based on the presupposed frequency. In one embodiment, when the battery charging circuit 200 is configured to be at work, the first duration signal TOFFA and the second duration signal TOFFB can adjust in real-time along with a variation of the circuitry parameters of the battery charging circuit 200, e.g., the first duration signal TOFFA and the second duration signal TOFFB can adjust in real-time along with a variation of one or more parameters of the input voltage VIN, the system voltage VSYS, the current IA flowing through the first switching circuit and the current IB flowing through the second switching circuit, thus adjusting the first off duration TA and the second off duration TB in real-time.

In one embodiment as shown in FIG. 3, the control circuit 22 further comprises a current sharing control loop 39, a first duration control circuit 40 and a second duration control circuit 41. The current sharing control loop 39 is configured to receive a first current feedback signal FBIA flowing through the first switching circuit and configured to receive a second current feedback signal FBIB flowing through the second switching circuit. The current sharing control loop 39 is configured to provide a first duration control signal CTA and a second duration control signal CTB based on the first current feedback signal FBIA and the second current feedback signal FBIB. The first duration control circuit 40 is configured to produce the first duration signal TOFFA which can be adjusted in real-time, thus the off duration of the first switching circuit can be adjusted in real-time. The second duration control circuit 41 is configured to produce the second duration signal TOFFB which can be adjusted in real-time, thus the off duration of the second switching circuit can be adjusted in real-time. In one embodiment, when detecting that the current IA flowing through the first switching circuit is larger than a presupposed current IB flowing through the second switching circuit, e.g., when a difference value (FBIA-FBIB) of the first current feedback signal FBIA and the second current feedback signal FBIB is larger than a presupposed value, the first duration control signal CTA is configured to adjust the first duration signal TOFFA to lengthen the off duration of the switch Q1, and the second duration control signal CTB is configured to adjust the second duration signal TOFFB to shorten the off duration of the switch Q3. When detecting that the current IB flowing through the second switching circuit is larger than a presupposed current IA flowing through the first switching circuit, e.g., when a difference value (FBIB-FBIA) of the second current feedback signal FBIB and the first current feedback signal FBIA is larger than the presupposed value, the first duration control signal CTA is configured to adjust the first duration signal TOFFA to shorten the off duration of the switch Q1, and the second duration control signal CTB is configured to adjust the second duration signal TOFFB to lengthen the off duration of the switch Q3. In one embodiment, the current sharing control loop 39, the first duration control circuit 40 and the second duration control circuit 41 can be realized by digital circuits. In another embodiment, the current sharing control loop 39 is realized by a digital circuit, and the first duration control circuit 40 and the second duration control circuit 41 can be realized by analog circuits.

In one embodiment, when the battery charging circuit 200 comprises a switching circuit with multi-phase, the current sharing control loop 39 can e.g. choose an average current flowing through the switching circuit with multi-phase as a current sharing reference. By comparing the current sharing reference with each current of the switching circuit with multi-phase, off duration control signals are configured to adjust an off duration of the switching circuit with multi-phase.

Figure 4:
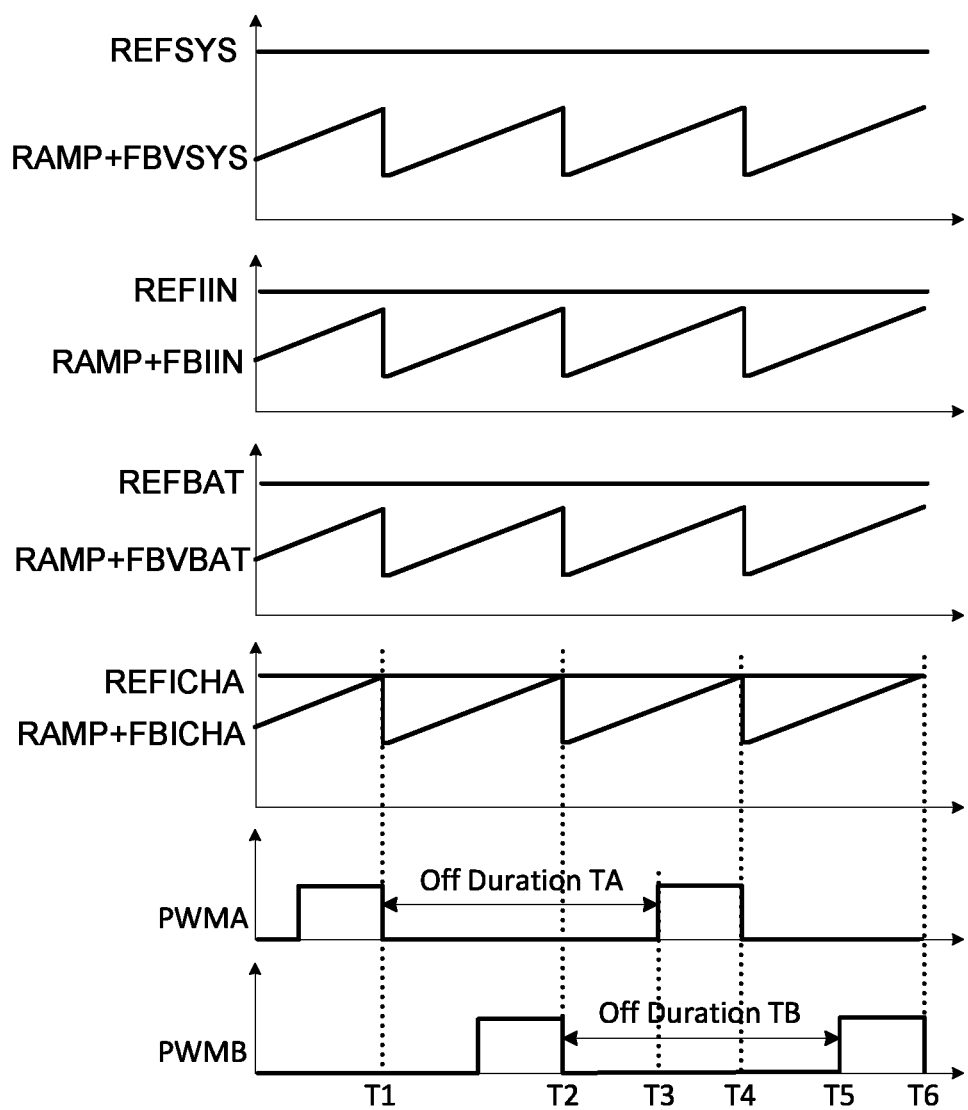
FIG. 4 shows waveforms of the control circuit 22 as shown in FIG. 3 according to an embodiment of the present invention.

FIG. 4 shows waveforms of the control circuit 22 as shown in FIG. 3 according to an embodiment of the present invention. The waveforms illustrated from top to bottom are: the system voltage reference signal REFSYS, the signal (RAMP+FBVSYS), the input current reference signal REFIIN, the signal (RAMP+FBIIN), the battery voltage reference signal REFBAT, the signal (RAMP+FBVBAT), the charging current reference signal REFICHA, the signal (RAMP+FBICHA), the switching control signal PWMA, and the switching control signal PWMB, wherein the signal (RAMP+FBVSYS) is superposed by the system voltage feedback signal FBVSYS and the ramp signal RAMP, the signal (RAMP+FBIIN) is superposed by the input current feedback signal FBIIN and the ramp signal RAMP, the signal (RAMP+FBVBAT) is superposed by the battery voltage feedback signal FBVBAT and the ramp signal RAMP, the signal (RAMP+FBICHA) is superposed by the charging current feedback signal FBICHA and the ramp signal RAMP. Working conditions of the charging current feedback control loop 33 are examples to explain the embodiment shown in FIG. 4. As shown in FIG. 4, at moments of T1, T2, T4, and T6, the signal (RAMP+FBICHA) increases to a value larger than the charging current reference signal REFICHA, and the control circuit 22 is configured to turn off the first switching circuit and the second switching circuit alternately. For example, at the moment of T1, when the signal (RAMP+FBICHA) increases to a value larger than the charging current reference signal REFICHA, the first switching control signal PWMA is configured to turn from high level to low level in order to turn off the first switching circuit, i.e. turn off the switch Q1. At the moment of T3, when the first off duration TA of the switch Q1 reaches to a duration set by the first duration control signal CTA, the switch Q1 is configured to turn on again. At the moment of T4, when the signal (RAMP+FBICHA) is larger than the charging current reference signal REFICHA, the first switching control signal PWMA is configured to turn from high level to low level again, and the switch Q1 is configured to turn off again. At the moment of T2, when the signal (RAMP+FBICHA) is larger than the charging current reference signal REFICHA, the second switching control signal PWMB is configured to turn from high level to low level in order to turn off the second switching circuit, i.e. turn off the switch Q3. At the moment of T5, when the second off duration TB of the switch Q3 reaches to a duration set by the second duration control signal CTB, the switch Q3 is configured to turn on again. At the moment of T6, when the signal (RAMP+FBICHA) is larger than the charging current reference signal REFICHA, the second switching control signal PWMB is configured to turn from high level to low level again, and the switch Q3 is configured to turn off again. So repeatedly.

Figure 5:
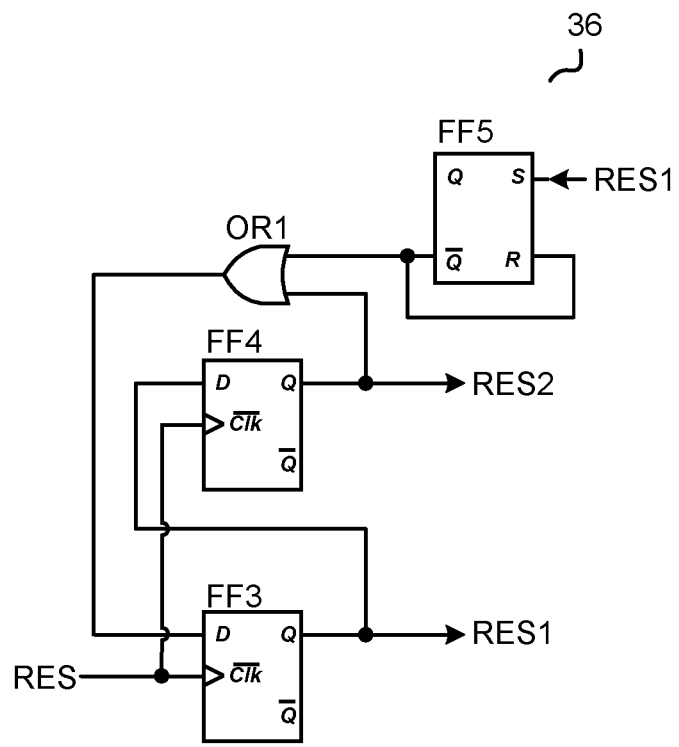
FIG. 5 schematically illustrates a frequency dividing circuit 36 in the control circuit 22 as shown in FIG. 3 according to an embodiment of the present invention.

FIG. 5 schematically illustrates the frequency dividing circuit 36 in the control circuit 22 as shown in FIG. 3 according to an embodiment of the present invention. In one embodiment as shown in FIG. 5, the frequency circuit 36 comprises a first D trigger circuit FF3, a second D trigger circuit FF4, an RS trigger circuit FF5 and a first OR gate OR1. The first D trigger circuit FF3 comprises an input terminal D, a clock terminal CLK and an output terminal Q, wherein the clock terminal CLK of the first D trigger circuit FF3 is configured to receive the logic integrated signal RES, and the output terminal Q of the first D trigger circuit FF3 is configured to provide the first frequency dividing signal RES1. The second D trigger circuit FF4 comprises an input terminal D, a clock terminal CLK and an output terminal Q, wherein the clock terminal CLK of the second D trigger circuit FF4 is configured to receive the logic integrated signal RES, and the input terminal D of the second D trigger circuit FF4 is coupled to the output terminal Q of the first D trigger circuit FF1, and the output terminal Q of the second D trigger circuit FF4 is configured to provide the second frequency dividing signal RES2. The RS trigger circuit FF5 comprises a set terminal S, a reset terminal R and an inverting output terminal /Q, wherein the set terminal S of the RS trigger circuit FF5 is configured to receive the first frequency dividing signal RES1, and the reset terminal R of the RS trigger circuit FF5 is coupled to the inverting output terminal /Q of the RS trigger circuit FF5. The first OR gate OR1 comprises a first input terminal, a second input terminal and an output terminal, wherein the first input terminal of the first OR gate OR1 is coupled to the inverting output terminal /Q of the RS trigger circuit FF5, and the second input terminal of the first OR gate OR1 is coupled to the output terminal Q of the second D trigger circuit FF4, and the output terminal of the first OR gate OR1 is coupled to the input terminal D of the first D trigger circuit FF3. The embodiment shown in FIG. 5 is one of the methods to realize the frequency dividing circuit. As known by the persons of ordinary skill, to be simplified, there further existing various methods not presented here to realize the frequency dividing circuit.

Figure 6:
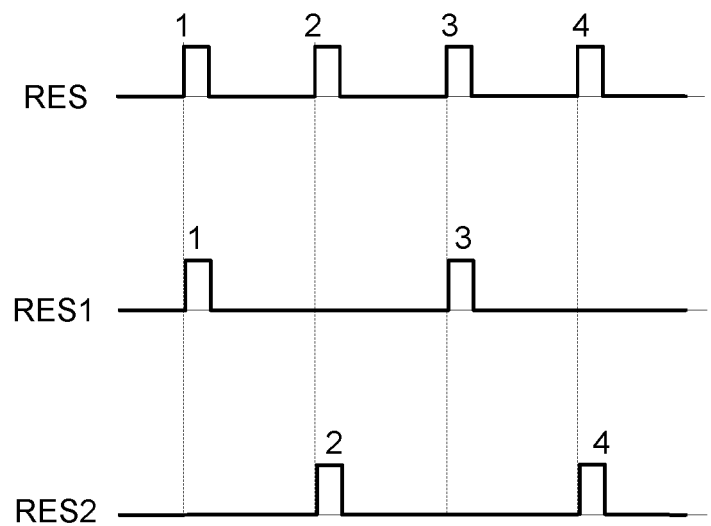
FIG. 6 shows waveforms of the frequency dividing circuit 36 as shown in FIG. 5 according to an embodiment of the present invention.

FIG. 6 shows waveforms of the frequency dividing circuit 36 as shown in FIG. 5 according to an embodiment of the present invention. The waveforms illustrated from top to bottom are: the logic integrated signal RES, the first frequency dividing signal RES1 and the second frequency signal RES2. The logic integrated signal's pulse is configured to be divided into two sequences orderly, wherein one sequence is configured to form the first frequency dividing signal RES1, and the other sequence is configured to form the second frequency dividing signal RES2. For instance, the frequency dividing circuit 36 is configured to divide the pulses 1, 2, 3, 4 of the logic integration signal RES into two sequences, e.g. one sequence including the pulses 1, 3 forms the first frequency dividing signal RES1, and the other sequence including the pulses 2, 4 forms the second frequency dividing signal RES2.

Figure 7:
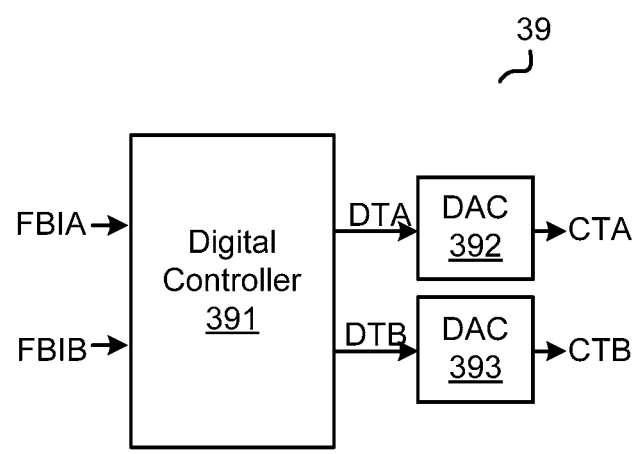
FIG. 7 schematically illustrates a current sharing control loop 39 in the control circuit 22 as shown in FIG. 2 according to an embodiment of the present invention.

FIG. 7 schematically illustrates the current sharing control loop 39 in the control circuit 22 as shown in FIG. 2 according to an embodiment of the present invention. In one embodiment as shown in FIG. 7, the current sharing control loop 39 comprises a digital controller 391, a first Digital-to-Analog converter (DAC) 392 and a second Digital-to-Analog converter (DAC) 393. The digital controller 391 e.g. comprises a Digital Signal Processor (DSP), a Micro-programmed Control Unit (MCU), a Microprocessor, an Application Specific Integrated Circuit (ASIC), a Complex Programmable Logic Device (CPLD), and a Field Programmable Gate Array (FPGA) and so on. The digital controller 391 is configured to produce the first off duration signal DTA and the second off duration signal DTB according to the first current feedback signal FBIA and the second current feedback signal FBIB, wherein the first off duration signal DTA and the second off duration signal DTB are presupposed as digital signals. The first Digital-to-Analog converter 392 is configured to produce the first duration control signal CTA according to the first off duration signal DTA. The second Digital-to-Analog converter 393 is configured to produce the second duration control signal CTB according to the second off duration signal DTB. In other embodiments, the current sharing loop 39 can be realized by an analog circuit. When detecting that a difference value of the current IA flowing through the first switching circuit and the current IB flowing through the second switching circuit is larger than a presupposed value, the digital controller 391 is configured to increase the first off duration signal DTA to lengthen the off duration of the switch Q1, i.e. to lengthen the off duration of the first switching circuit, meanwhile the digital controller 391 is configured to decrease the second off duration signal DTB to shorten the off duration of the switch Q3, i.e. to shorten the off duration of the second switching circuit. When detecting that a difference value of the current IB flowing through the second switching circuit and the current IA flowing through the first switching circuit is larger than the presupposed value, the digital controller 391 is configured to increase the second off duration signal DTB to lengthen the off duration of the switch Q3, i.e. to lengthen the off duration of the second switching circuit, meanwhile the digital controller 391 is configured to decrease the first off duration signal DTA to shorten the off duration of the switch Q1, i.e. to shorten the off duration of the first switching circuit.

In one embodiment, the current sharing control loop 39, the first duration control circuit 40 and the second duration control circuit 41 can be realized by the digital controller 391. For instance, the first off duration signal DTA produced by the digital controller 391 is the first duration control signal CTA, and the second off duration signal DTB produced by the digital controller 391 is the second duration control signal CTB. In one embodiment, the first duration control circuit 40 starts to time at the off moment of the switch Q1, and stops to time till the timing time is equal to the first off duration signal DTA, then the first duration control circuit 40 is configured to turn on the switch Q1 by the first duration signal TOFFA. The second duration control circuit 41 starts to time at the off moment of the switch Q3, and stops to time till the timing time is equal to the second off duration signal DTB, then the second duration control circuit 41 is configured to turn on the switch Q3 by the second duration signal TOFFB.

Figure 8:
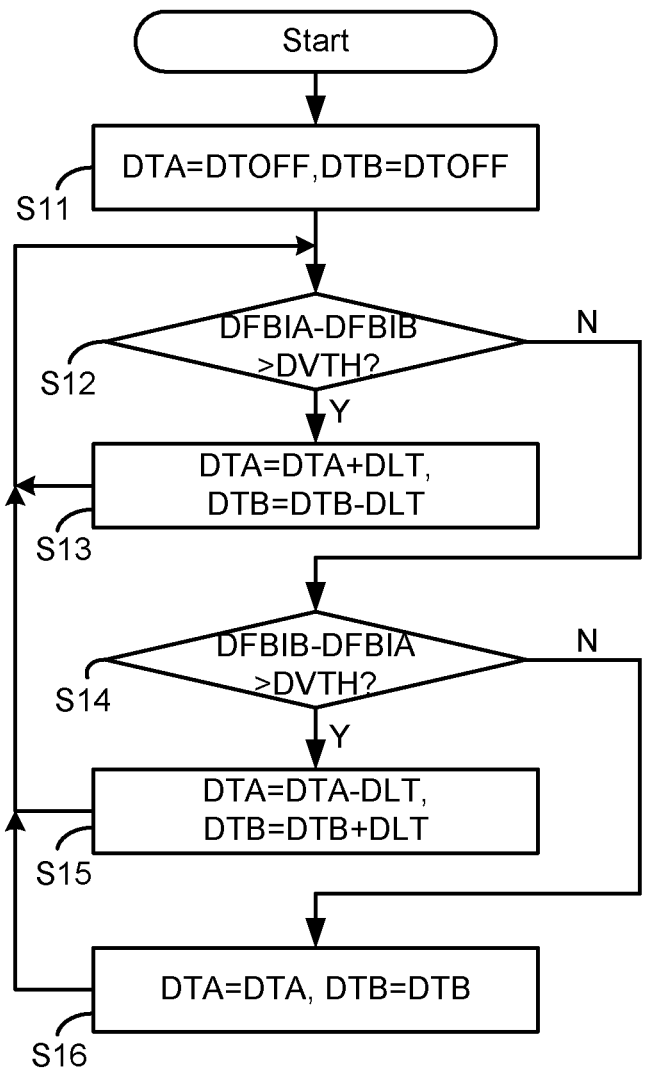
FIG. 8 shows a flow chart illustrating a control method for the digital controller 391 as shown in FIG. 7 according to an embodiment of the present invention.

FIG. 8 shows a flow chart illustrating a control method for the digital controller 391 as shown in FIG. 7 according to an embodiment of the present invention, comprising steps S11-S16. At step S11, initializing the first off duration signal DTA and the second off duration signal DTB to make them equal to an initialized off duration DTOFF. In one embodiment, the initialized off duration DTOFF is a constant value. In another embodiment, the initialized off duration DTOFF can be obtained by calculating according to a presupposed frequency. At step S12, judging whether the difference value (DFBIA−DFBIB) of the first current feedback signal DFBIA and the second current feedback signal DFBIB is larger than a presupposed value DVTH, wherein the first current feedback signal DFBIA represents the current IA flowing through the first switching circuit, the second current feedback signal DFBIB represents the current IB flowing through the second switching circuit, and the presupposed value DVTH is a digital signal. When DFBIA−

DFBIB>DVTH, it is configured to turn to step S13, increasing the first off duration signal DTA and decreasing the second off duration signal DTB, i.e. DTA=DTA+DLT, DTA=DTA−DLT, wherein DTL is one or more units of the digital controller's 391 step length. Then it is configured to turn back to step S12 to continue the judgment. At step 12, when DFBIA−DFBIB is not larger than DVTH, it is configured to turn to step 14, judging whether the difference value (DFBIB−DFBIA) of the second current feedback signal DFBIB and the first current feedback signal DFBIA is larger than a presupposed value DVTH. When DFBIB−DFBIA>DVTH, it is configured to turn to step S15, increasing the second off duration signal DTB and decreasing the first off duration signal DTA, i.e. DTA=DTA−DLT, DTB=DTB+DLT. Then it is configured to turn back to step S12 to continue the judgment. At step S14, when DFBIB−DFBIA is not larger than DVTH, it is configured to turn to S16, the first off duration signal DTA and the second off duration DTB keep constant. Then it is configured to turn back to step S13 to continue the judgment.

Figure 9:
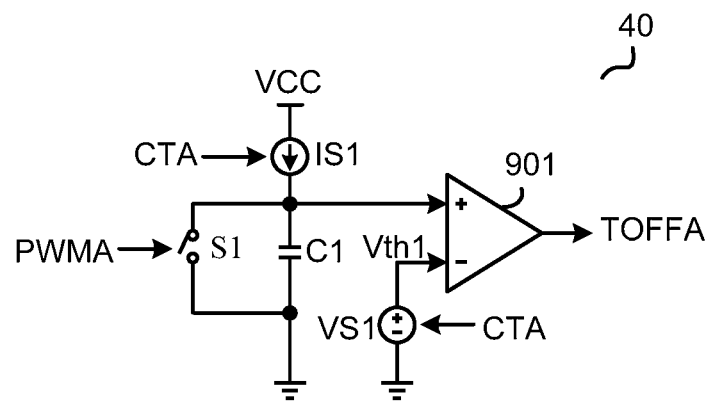
FIG. 9 schematically illustrates a first duration control circuit 40 in the control circuit 22 as shown in FIG. 2 according to an embodiment of the present invention.

FIG. 9 schematically illustrates the first duration control circuit 40 in the control circuit 22 as shown in FIG. 2 according to an embodiment of the present invention. In one embodiment as shown in FIG. 9, the first duration control circuit 40 comprises a first current source IS1, a first capacitor C1, a first discharge switch S1, a first voltage source VS1 and a first comparison circuit 901, wherein the first current source IS1 and the first capacitor C1 are coupled in series between a logic service voltage VCC and the reference ground, the first discharge switch S1 and the first capacitor C1 are coupled in parallel. A first terminal and a second terminal of the first discharge switch S1 are coupled across the first capacitor C1 respectively. A control terminal of the first discharge switch S1 is configured to receive the first switching control signal PWMA, and the first discharge switch S1 is turned on and off based on the first switching control signal PWMA. The first comparison circuit 901 comprises a non-inverting input terminal, an inverting input terminal and an output terminal, wherein the non-inverting input terminal is coupled to a common node of the first capacitor C1 and first current source IS1, the inverting input terminal is coupled to the first voltage source VS1 to receive a first reference signal Vth1, the output terminal is configured to provide the first duration signal TOFFA. According to the first duration control signal CTA, the first duration control circuit 40 is configured to adjust the current provided by the first switching circuit or adjust the first reference signal Vth1, thus adjusting the off duration TA of the first switching circuit. For instance, when the first switching control signal PWMA turns on the switch Q1, the first discharge switch S1 is configured to be turned on, and a voltage across the capacitor C1 is configured to be zero; When the first switching control signal PWMA turns off the switch Q1, the first discharge switch S1 is configured to turn off, the first current source IS1 is configured to charge the first capacitor C1, and the voltage across the capacitor C1 is configured to increase gradually until to the first reference signal Vth1, then the first duration signal TOFFA is configured to be a high level to turn on the switch Q1. The first duration control signal CTA is configured to adjust the first duration signal TOFFA to lengthen the off duration TA of the switch Q1, i.e. to decrease a current of the first current source IS1 or increase the first reference signal Vth1. The first duration control signal CTA is configured to adjust the first duration signal TOFFA to shorten the off duration TA of the switch Q1, i.e. to increase the current of the first current source IS1 or decrease the first reference signal Vth1. As the persons of ordinary skill known, specific implementations of lengthening or shortening the off duration TA according to the first duration signal TOFFA is not limited to the embodiment as shown in FIG. 9, wherein the first duration signal TOFF is produced based on the first duration control signal CTA.

Figure 10:
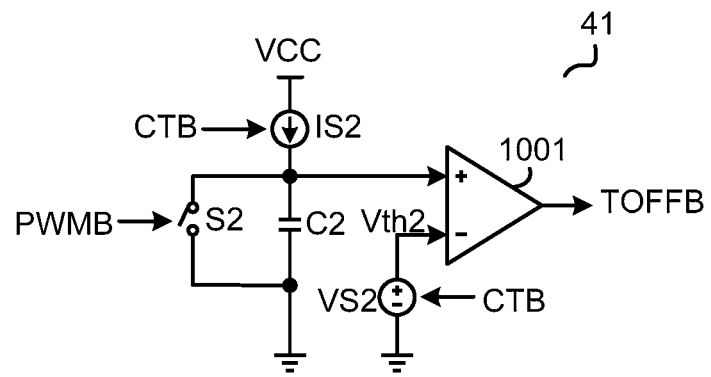
FIG. 10 schematically illustrates a second duration control circuit 41 in the control circuit 22 as shown in FIG. 2 according to an embodiment of the present invention.

FIG. 10 schematically illustrates the second duration control circuit 41 in the control circuit 22 as shown in FIG. 2 according to an embodiment of the present invention. In one embodiment as shown in FIG. 10, the first duration control circuit 41 comprises a second current source IS2, a second capacitor C2, a second discharge switch S2, a second voltage source VS2 and a second comparison circuit 1001, wherein the second current source IS2 and the second capacitor C2 are coupled in series between the logic service voltage VCC and the reference ground, the second discharge switch S2 and the second capacitor C2 are coupled in parallel. A first terminal and a second terminal of the second discharge switch S2 are coupled across the second capacitor C2 respectively. A control terminal of the second discharge switch S2 is configured to receive the second switching control signal PWMB, and the second discharge switch S2 is configured to be turned on and off based on the second switching control signal PWMB. The second comparison circuit 1001 comprises a non-inverting input terminal, an inverting input terminal and an output terminal, wherein the non-inverting input terminal is coupled to a common node of the second capacitor C2 and second current source IS2, the inverting input terminal is coupled to the second voltage source VS2 to receive a second reference signal Vth2, and the output terminal is configured to provide the second duration signal TOFFB. According to the second duration control signal CTB, the second duration control circuit 41 is configured to adjust the current provided by the second switching circuit or adjust the second reference signal Vth2, thus adjusting the second off duration TB of the second switching circuit. For instance, when the second switching control signal PWMB turns on the switch Q2, the second discharge switch S2 is configured to be turned on, and a voltage across the second capacitor C2 is configured to be zero; When the second switching control signal PWMB turns off the switch Q2, the second discharge switch S2 is configured to be turned off, and the second current source IS2 is configured to charge the second capacitor C2, and the voltage across the second capacitor C2 is configured to increase gradually until to the second reference signal Vth2, then the second duration signal TOFFB is configured to be a high level to turn on the switch Q2. The second duration control signal CTB is configured to adjust the second duration signal TOFFB to lengthen the off duration TB of the switch Q2, i.e. to decrease a current of the second current source IS2 or increase the second reference signal Vth2. The second duration control signal CTB is configured to adjust the second duration signal TOFFB to shorten the off duration TB of the switch Q2, i.e. to increase the current of the second current source IS2 or decrease the second reference signal Vth2. As the persons of ordinary skill known, specific implementations of lengthening or shortening the off duration TB according to the second duration signal TOFFB is not limited to the embodiment as shown in FIG. 10, wherein the second duration signal TOFFB is produced based on the second duration control signal CTB.

Figure 11:
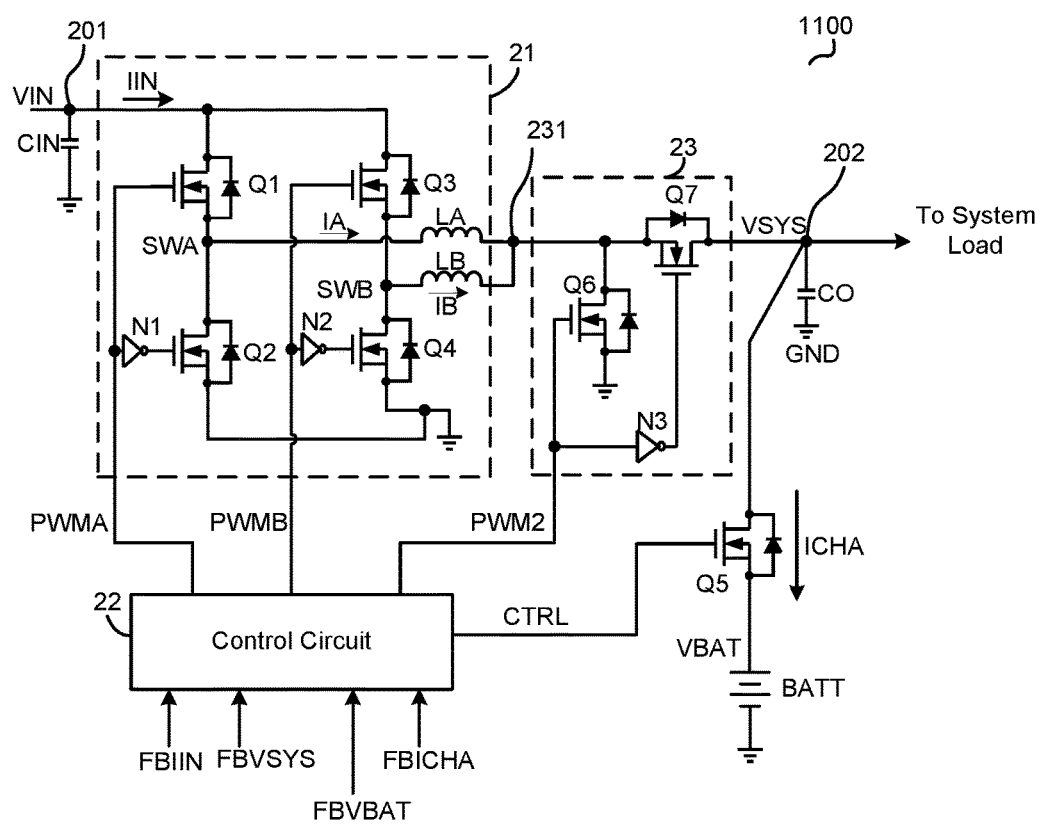
FIG. 11 schematically illustrates a battery charging circuit 1100 according to an embodiment of the present invention.

FIG. 11 schematically illustrates a battery charging circuit 1100 according to an embodiment of the present invention. The battery charging circuit 1100 comprises the switching circuit 21, a switching circuit 23 and the control circuit 22. The switching circuit 21 comprises the first switching circuit and the second switching circuit, wherein the first switching circuit comprises the switch Q1, the switch Q2 and the inductance LA, and the second switching circuit comprises the switch Q3, the switch Q4 and the inductance LB, wherein the first switching circuit and the second switching circuit are coupled in parallel between the input terminal 201 and a node 231 of the battery charging circuit 1100. In one embodiment as shown in FIG. 11, a topology with two-phase is an example to illustrate the switching circuit 21. As the persons of ordinary skill known, the switching circuit 21 can be a topology with multi-phase. The switching circuit 23 comprises a switch Q6 and a switch Q7. MOSFET is an example to illustrate the switch Q6 and the switch Q7 in FIG. 11. In other embodiments, the switch Q6 and the switch Q7 can be Bipolar Junction Transistor (BJT), Junction Field-effect Transistor (JFET), and Insulated Gate Bipolar Transistor (IGBT) and so on. A first terminal of the switch Q6 is coupled to the node 231, and a second terminal of the switch Q6 is coupled to the system ground. A first terminal of the switch Q7 is coupled to the node 231, and a second terminal of the switch Q7 is coupled to the output terminal 202 of the battery charging circuit 200 to provide the system voltage VSYS across the output capacitor CO. The control circuit 22 is configured to receive the input current feedback signal FBIIN, the system voltage feedback signal FBVSYS, the battery voltage feedback signal FBVBAT, and the charging current feedback signal FBICHA, wherein the input current feedback signal FBIIN represents the input current IIN of the battery charging circuit 1100, the system voltage feedback signal FBVSYS represents the system voltage VSYS provided by the battery charging circuit 1100, the battery voltage feedback signal FBVBAT represents the battery voltage VBAT, and the charging current feedback signal FBICHA represents the charging current ICHA, wherein the charging current ICHA is configured to charge the battery BATT. Then the control circuit 22 is configured to provide the first switching control signal PWMA to turn on or off the switch Q1 and the switch Q2, the control circuit 22 is configured to provide the second switching control signal PWMB to turn on or off the switch Q3 and the switch Q4, the control circuit 22 is configured to provide a third switching control signal PWM2 to turn on or off the switch Q6 and the switch Q7, and the control circuit 22 is configured to provide the switching control signal CTRL to turn on or off the switch Q5. In one embodiment, when the input voltage VIN is larger than the battery voltage VBAT, the third switching control signal PWM2 is configured to keep the switch Q6 off and keep the switch Q7 on, thus the battery charging circuit 1100 is configured to be a step-down circuit. In another embodiment, when the input voltage VIN is smaller than the battery voltage VBAT, the first switching control signal PWMA and the second switching control signal PWMB are configured to keep at least one of the first switching circuit and the second switching circuit on, i.e. keep at least one of the switch Q1 and the switch Q2 on and keep the switch Q2 and the switch Q4 off, and the third switching control signal PWM2 is configured to turn on and off the switch Q6 and the switch Q7 according to the plurality of feedback control signals, thus the battery charging circuit 1100 is configured to be a step-up circuit. Due to the switching circuit 23, the battery charging circuit 1100 can not only satisfy diversified sets of the input power and the battery but also have a large charging current.

Figure 12:
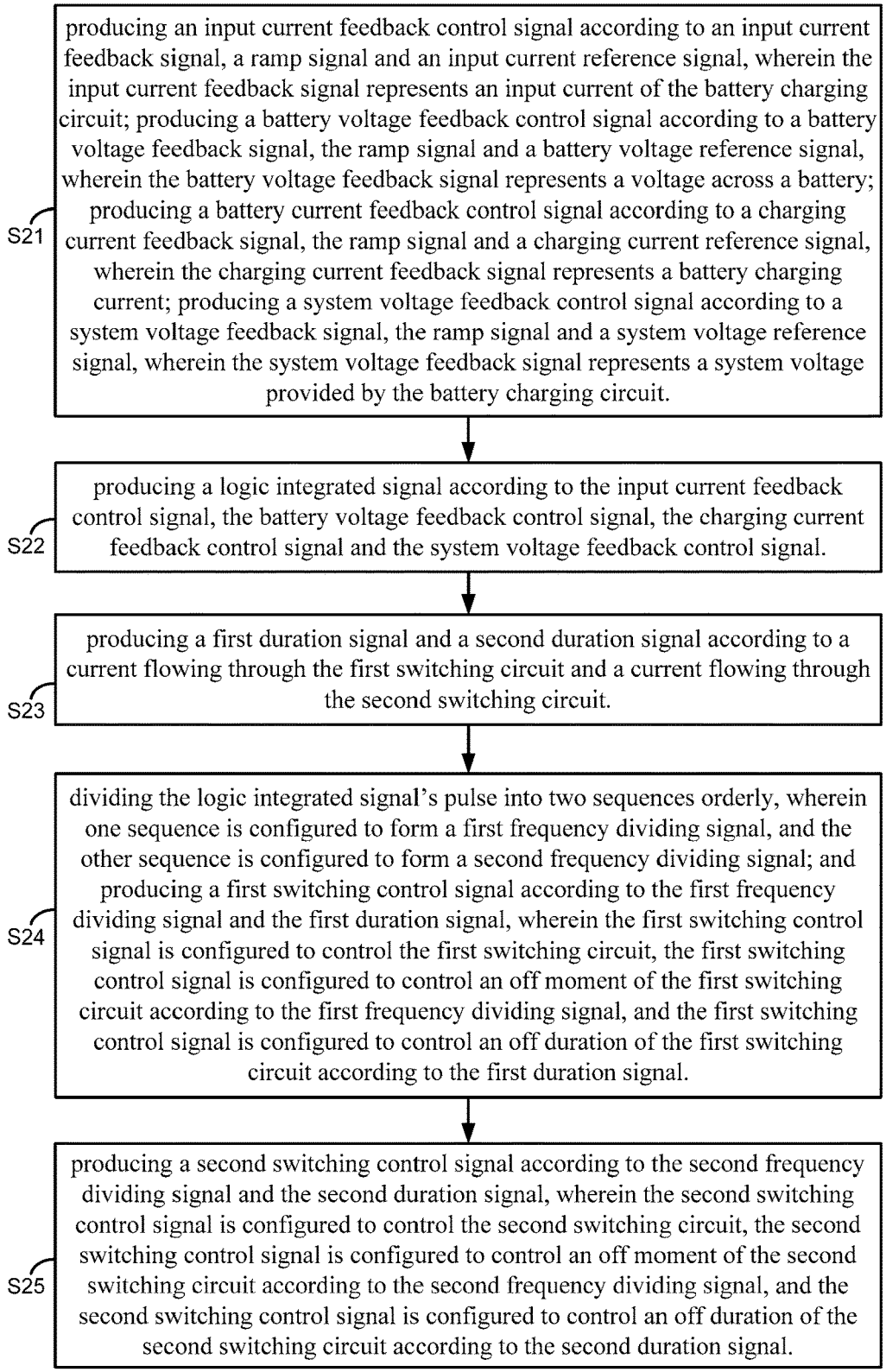
FIG. 12 shows a flow chart illustrating a control method for a battery charging circuit according to an embodiment of the present invention.

FIG. 12 shows a flow chart illustrating a control method for a battery charging circuit according to an embodiment of the present invention. The battery charging circuit comprises an input terminal, an output terminal, a first switching circuit and a second switching circuit, wherein the first switching circuit and the second switching circuit are coupled in parallel.

At step S21, producing an input current feedback control signal according to an input current feedback signal, a ramp signal and an input current reference signal, wherein the input current feedback signal represents an input current of the battery charging circuit; producing a battery voltage feedback control signal according to a battery voltage feedback signal, the ramp signal and a battery voltage reference signal, wherein the battery voltage feedback signal represents a voltage across a battery; producing a battery current feedback control signal according to a charging current feedback signal, the ramp signal and a charging current reference signal, wherein the charging current feedback signal represents a battery charging current; producing a system voltage feedback control signal according to a system voltage feedback signal, the ramp signal and a system voltage reference signal, wherein the system voltage feedback signal represents a system voltage provided by the battery charging circuit.

At step S22, producing a logic integrated signal according to the input current feedback control signal, the battery voltage feedback control signal, the charging current feedback control signal and the system voltage feedback control signal.

At step S23, producing a first duration signal and a second duration signal according to a current flowing through the first switching circuit and a current flowing through the second switching circuit.

At step S24, dividing the logic integrated signal's pulse into two sequences orderly, wherein one sequence is configured to form a first frequency dividing signal, and the other sequence is configured to form a second frequency dividing signal; and producing a first switching control signal according to the first frequency dividing signal and the first duration signal, wherein the first switching control signal is configured to control the first switching circuit, the first switching control signal is configured to control an off moment of the first switching circuit according to the first frequency dividing signal, and the first switching control signal is configured to control an off duration of the first switching circuit according to the first duration signal.

At step S25, producing a second switching control signal according to the second frequency dividing signal and the second duration signal, wherein the second switching control signal is configured to control the second switching circuit, the second switching control signal is configured to control an off moment of the second switching circuit according to the second frequency dividing signal, and the second switching control signal is configured to control an off duration of the second switching circuit according to the second duration signal.

In one embodiment, when a difference value of the current flowing through the first switching circuit and the current flowing through the second switching circuit is larger than a presupposed value, the first duration signal is configured to lengthen the off duration of the first switching circuit, and the second duration signal is configured to shorten the off duration of the second switching circuit; and when a difference value of the current flowing through the second switching circuit and the current flowing through the first switching circuit is larger than a presupposed value, the first duration signal is configured to shorten the off duration of the first switching circuit and the second duration signal is configured to lengthen the off duration of the second switching circuit.

In one embodiment, when any one of a signal superposed by the input current feedback signal and the ramp signal, a signal superposed by the battery voltage feedback signal and the ramp signal, a signal superposed by the input voltage feedback signal and the ramp signal, and a signal superposed by the system voltage feedback signal and the ramp signal is larger than a reference signal, the logic integrated signal is configured to be a first condition to turn off one of the first switching circuit and the second switching circuit, e.g. high level.

Note that in the flow chart described above, the box functions may also be implemented with different orders as shown in FIG. 12. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A battery charging circuit, having an input terminal configured to receive an input voltage and an output terminal configured to provide a system voltage, the battery charging circuit comprising:
    a first switching circuit, having a first terminal and a second terminal, wherein the first switching circuit comprises a first switch, the first terminal of the first switching circuit is coupled to the input terminal of the battery charging circuit, the second terminal of the first switching circuit is coupled to the output terminal of the battery charging circuit;
    a second switching circuit, comprising a second switch, wherein the second switching circuit and the first switching circuit are coupled in parallel between the input terminal and the output terminal of the battery charging circuit;
    a plurality of feedback control loops, configured to provide a plurality of feedback control signals, wherein each feedback control loop receives a feedback signal, a ramp signal and a reference signal, wherein the plurality of feedback control signals are configured to turn off one of the first switching circuit and the second switching circuit;
    a logic integrated circuit, coupled to the plurality of feedback control loops to receive the plurality of feedback control signals, and configured to provide a logic integrated signal based on the plurality of feedback control signals;
    a frequency dividing circuit, coupled to the logic integrated circuit to receive the logic integrated signal, and configured to divide the logic integrated signal's pulse into two sequences orderly, wherein one sequence is configured to form a first frequency dividing signal, and the other sequence is configured to form a second frequency dividing signal;
    a first duration control circuit, configured to receive a first duration control signal and configured to provide a first duration signal, wherein the first duration signal is adjustable in real-time;
    a second duration control circuit, configured to receive a second duration control signal and configured to provide a second duration signal, wherein the second duration signal is adjustable in real-time;
    a first logic circuit, configured to receive the first frequency dividing signal and the first duration signal, and configured to provide a first switching control signal to control the first switch of the first switching circuit, wherein the first logic circuit is configured to control an off moment of the first switch according to the first frequency dividing signal, and configured to control an off duration of the first switch according to the first duration signal; and
    a second logic circuit, configured to receive the second frequency dividing signal and the second duration signal, and configured to provide a second switching control signal to control the second switch of the second switching circuit, wherein the second logic circuit is configured to control an off moment of the second switch according to the second frequency dividing signal, and configured to control an off duration of the second switch according to the second duration signal.

2. The battery charging circuit of claim 1, further comprising:
    a current sharing control loop, configured to receive a first current feedback signal representing a current flowing through the first switching circuit and receive a second current feedback signal representing a current flowing through the second switching circuit, and configured to produce the first duration control signal and the second duration control signal.

3. The battery charging circuit of claim 2, wherein the current sharing control loop further comprises:
    a digital controller, configured to produce a first off duration signal and a second off duration signal according to the first current feedback signal and the second current feedback signal, wherein the first off duration signal and the second off duration signal are presupposed digitally;
    a first Digital-to-Analog converter, configured to produce the first duration control signal according to the first off duration signal; and
    a second Digital-to-Analog converter, configured to produce the second duration control signal according to the second off duration signal.

4. The battery charging circuit of claim 2, wherein
    when a difference value of the first current feedback signal and the second current feedback signal is larger than a presupposed value, the first duration control signal is configured to adjust the first duration control signal to lengthen the off duration of the first switch and configured to adjust the second duration control signal to shorten the off duration of the second switch; and
    when a difference value of the second feedback signal and the first current feedback signal is larger than a presupposed value, the second duration control signal is configured to adjust the first duration control signal to shorten the off duration of the first switch and configured to adjust the second duration control signal to lengthen the off duration of the second switch.

5. The battery charging circuit of claim 1, wherein the first duration control circuit comprises:
    a first current source;
    a first capacitor, coupled in series with the first current source;
    a first discharge switch, coupled in parallel with the first capacitor, wherein the first switching control signal is configured to turn on and off the first discharge switch; and a first comparison circuit, having a first input terminal, a second input terminal and an output terminal, wherein the first terminal of the first comparison circuit is coupled to a common node of the first current source and the first capacitor, the second input terminal of the first comparison circuit is configured to receive a first reference signal, and the output terminal of the first comparison circuit is configured to provide the first duration signal; wherein the first duration control circuit is configured to adjust a current provided by the first current source and adjust the first reference signal according to the first duration control signal.

6. The battery charging circuit of claim 1, wherein the second duration control circuit comprises:

a second current source;

a second capacitor, coupled in series with the first current source;

a second discharge switch, coupled in parallel with the second capacitor, wherein the second switching control signal is configured to turn on and off the second discharge switch; and a second comparison circuit, having a first input terminal, a second input terminal and an output terminal, wherein the first input terminal of the second comparison circuit is coupled to a common node of the second current source and the second capacitor, the second input terminal of the second comparison circuit is configured to receive a second reference signal, and the output terminal of the second comparison circuit is configured to provide the second duration signal; wherein the second duration control circuit is configured to adjust a current provided by the second current source and adjust the second reference signal according to the second duration control signal.

7. The battery charging circuit of claim 1, wherein the frequency dividing circuit comprises:

a first D trigger circuit, having an input terminal, a clock terminal and an output terminal, wherein the clock terminal of the first D trigger circuit is configured to receive the logic integrated signal, and the output terminal of the first D trigger circuit is configured to provide the first frequency dividing signal;

a second D trigger circuit, having an input terminal, a clock terminal and an output terminal, wherein the clock terminal of the second D trigger circuit is configured to receive the logic integrated signal, the input terminal of the second D trigger circuit is coupled to the output terminal of the first D trigger circuit, and the output terminal of the second D trigger circuit is configured to provide the second frequency dividing signal;

an RS trigger circuit, having a set terminal, a reset terminal and an inverting output terminal, wherein the set terminal of the RS trigger circuit is configured to receive the first frequency dividing signal, and the reset terminal of the RS trigger circuit is coupled to the inverting terminal of the RS trigger circuit; and a first OR gate, having a first input terminal, a second input terminal and an output terminal, wherein the first input terminal of the first OR gate is coupled to the inverting output terminal of the RS trigger circuit, the second input terminal of the first OR gate is coupled to the output terminal of the second D trigger circuit, and the output terminal of the first OR gate is coupled to the input terminal of the first D trigger circuit.

8. The battery charging circuit of claim 1, wherein the logic integrated circuit comprises a second OR gate, wherein a plurality of input terminals of the second OR gate are configured to receive the plurality of feedback control signals respectively, and the logic integrated circuit is configured to provide the logic integrated signal through the output terminal of the second OR gate.

9. The battery charging circuit of claim 1, further comprising:

a third switch, having a first terminal and a second terminal, wherein the first terminal of the third switch is coupled to the second terminal of the first switching circuit, and the second terminal of the third switch is coupled to the system ground; and a fourth switch, having a first terminal and a second terminal, wherein the first terminal of the fourth switch is coupled to the second terminal of the second switching circuit, and the second terminal of the fourth switch is coupled to the system ground.

10. The battery charging circuit of claim 9, wherein:

when the input voltage provided through the input terminal of the battery charging circuit is larger than the system voltage, the battery charging circuit is configured to be a step-down circuit, the third switch is configured to keep off, and the fourth switch is configured to keep on; and when the input voltage provided through the input terminal of the battery charging circuit is smaller than the system voltage, the battery charging circuit is configured to be a step-up circuit, and at least one of the first switching circuit and the second switching circuit is configured to keep on, and the logic integrated signal is configured to control the third switch and the fourth switch.

11. The battery charging circuit of claim 1, wherein the first switch comprises a first terminal coupled to the input terminal of the battery charging circuit and a second terminal, the second switch comprises a first terminal coupled to the input terminal of the battery charging circuit and a second terminal, the battery charging circuit further comprising:

a first inductance, comprising a first terminal and a second terminal, wherein the first terminal of the first inductance is coupled to the second terminal of the first switch, the second terminal of the first inductance is couple to the output terminal of the battery charging circuit; and a second inductance, comprising a first terminal and a second terminal, wherein the first terminal of the second inductance is coupled to the second switch, the second terminal of the second inductance is coupled to the output terminal of the battery charging circuit.

12. The battery charging circuit of claim 1, wherein the first switch comprises a first terminal coupled to the input terminal of the battery charging circuit and a second terminal, the second switch comprises a first terminal coupled to the input terminal of the battery charging circuit and a second terminal, the first terminal of the first switch and the first terminal of the second switch are coupled to the input terminal of the battery charging switch via a unidirectional conducting device.

13. The battery charging circuit of claim 1, wherein the plurality of feedback control loops comprise:

an input current feedback control loop, based on a signal superposed by the ramp signal and an input current feedback signal representing an input current of the battery charging circuit, is configured to compare with an input current reference signal and produce an input current feedback control signal;
a battery voltage feedback control loop, based on a signal superposed by the ramp signal and a battery voltage feedback signal representing a voltage across a battery, is configured to compare with a battery voltage reference signal and produce a battery voltage feedback control signal;
a charging current feedback control loop, based on a signal superposed by the ramp signal and a charging current feedback signal representing a battery charging current, is configured to compare with a charging current reference signal and produce a charging current feedback control signal; and
a system voltage feedback control loop, based on a signal superposed by the ramp signal and a system voltage feedback signal representing the system voltage provided by the battery charging circuit, is configured to compare with a system voltage reference signal and produce a system voltage feedback control signal.

14. The battery charging circuit of claim 13, when any one of the signal superposed by the ramp signal and the input current feedback signal, the signal superposed by the ramp signal and the battery voltage feedback signal, the signal superposed by the ramp signal and the input voltage feedback signal, and the signal superposed by the ramp signal and the system voltage feedback signal is bigger than a reference signal, the logic integrated signal is configured be a first condition in order to turn off one of the first switching circuit and the second switching circuit.

15. A control circuit for a battery charging circuit, the battery charging circuit has an input terminal, an output terminal, a first switching circuit and a second switching circuit, wherein the first switching circuit and the second switching circuit are coupled in parallel between the input terminal and the output terminal of the battery charging circuit, the control circuit comprises:
a plurality of feedback control loops, configured to provide a plurality of feedback control signals, wherein each feedback control loop receives a feedback signal, a ramp signal and a reference signal, wherein the plurality of feedback control signals are configured to turn off one of the first switching circuit and the second switching circuit;
an OR gate, coupled to the plurality of feedback control loops to receive the plurality of feedback control signals, and configured to provide a logic integrated signal based on the plurality of feedback control signals;
a frequency dividing circuit, coupled to the OR gate to receive the logic integrated signal and configured to divide the logic integrated signal's pulse into two sequences orderly, wherein one sequence is configured to form a first frequency dividing signal, and the other sequence is configured to form a second frequency dividing signal;
a current sharing control loop, configured to receive a first current feedback signal representing a current flowing through the first switching circuit and a second current feedback signal representing a current flowing through the second switching circuit, and configured to produce a first duration control signal and a second duration control signal;
a first duration control circuit, configured to receive the first duration control signal and provide a first duration signal, wherein the first duration signal is adjustable in real-time;
a second duration control circuit, configured to receive the second duration control signal and provide a second duration signal, wherein the second duration signal is adjustable in real-time;
a first logic circuit, configured to receive the first frequency dividing signal and the first duration signal, and configured to provide a first switching control signal to control a first switch of the first switching circuit, wherein the first logic circuit is configured to control an off moment of the first switch according to the first frequency dividing signal, and configured to control an off duration of the first switch according to the first duration signal; and
a second logic circuit, configured to receive the second frequency dividing signal and the second duration signal, and configured to provide a second switching control signal to control a second switch of the second switching circuit, wherein the second logic circuit is configured to control an off moment of the second switch according to the second frequency dividing signal, and configured to control an off duration of the second switch according to the second duration signal.

16. The control circuit of claim 15, wherein the plurality of feedback control loops comprise:
an input current feedback control loop, is configured to compare a signal with an input current reference signal to produce an input current feedback control signal, wherein the signal is superposed by the ramp signal and an input current feedback signal representing an input current of the battery charging circuit;
a battery voltage feedback control loop, is configured to compare a signal with a battery voltage reference signal to produce a battery voltage feedback control signal, wherein the signal is superposed by the ramp signal and a battery voltage feedback signal representing a voltage across a battery;
a charging current feedback control loop, is configured to compare a signal with a charging current reference signal to produce a charging current feedback control signal, wherein the signal is superposed by the ramp signal and a charging current feedback signal representing a battery charging current; and
a system voltage feedback control loop, is configured to compare a signal with a system voltage reference signal to produce a system voltage feedback control signal, wherein the signal is superposed by the ramp signal and a system voltage feedback signal representing the system voltage provided by the battery charging circuit.

17. The control circuit of claim 15, wherein when any one of the signal superposed by the ramp signal and the input current feedback signal, the signal superposed by the ramp signal and the battery voltage feedback signal , the signal superposed by the ramp signal and the input voltage feedback signal, and the signal superposed by the ramp signal and the system voltage feedback signal is larger than a reference signal, the logic integrated signal is configured to be a first condition in order to turn off one of the first switching circuit and the second switching circuit.

18. The control circuit of claim 15, wherein:
when a difference value of the first current feedback signal and the second current feedback signal is larger than a presupposed value, the current sharing control loop is configured to adjust the first duration control signal to lengthen the off duration of the first switching circuit, and configured to adjust the second duration control signal to shorten the off duration of the second switching circuit; and when a difference value of the second feedback signal and the first current feedback signal is larger than the presupposed value, the current sharing control loop is configured to adjust the first duration control signal to shorten the off duration of the first switching circuit, and configured to adjust the second control signal to shorten the off duration of the second switching circuit.

19. A control method for a battery charging circuit, the battery charging circuit has an input terminal, an output terminal, a first switching circuit and a second switching circuit, wherein the first switching circuit and the second switching circuit are coupled in parallel between the input terminal and the output terminal of the battery charging circuit, the control method comprising:

producing an input current feedback control signal according to an input current feedback signal, a ramp signal and an input current reference signal, wherein the input current feedback signal represents an input current of the battery charging circuit;

producing a battery voltage feedback control signal according to a battery voltage feedback signal, the ramp signal and a battery voltage reference signal, wherein the battery voltage feedback signal represents a voltage across a battery;

producing a charging current feedback control signal according to a charging current feedback signal, the ramp signal and a charging current reference signal, wherein the charging current feedback signal represents a battery charging current;

producing a system voltage feedback control signal according to a system voltage feedback signal, the ramp signal and a system voltage reference signal, wherein the system voltage feedback signal represents a system voltage provided by the battery charging circuit;

producing a logic integrated signal according to the input current feedback control signal, the battery voltage feedback control signal, the charging current feedback control signal and the system voltage feedback control signal;

producing two sequences orderly based on the logic integrated signal's pulse, wherein one sequence is configured to form a first frequency dividing signal, and the other sequence is configured to form a second frequency dividing signal;

producing a first duration signal and a second duration signal according to a current flowing through the first switching circuit and a current flowing through the second switching circuit;

producing a first switching control signal according to the first frequency dividing signal and the first duration signal in order to control the first switching circuit, wherein the first switching control signal is configured to control an off moment of the first switching circuit according to the first frequency dividing signal, and control an off duration of the first switching circuit according to the first duration signal; and producing a second switching control signal according to the second frequency dividing signal and the second duration signal in order to control the second switching circuit, wherein the second switching control signal is configured to control an off moment of the second switching circuit according to the second frequency dividing signal, and control an off duration of the second switching circuit according to the second duration signal; wherein when a difference value of the current flowing through the first switching circuit and the current flowing through the second switching circuit is larger than a presupposed value, the first duration signal is configured to lengthen the off duration of the first switching circuit, and the second duration signal is configured to shorten the off duration of the second switching circuit; and when a difference value of the current flowing through the second switching circuit and the current flowing through the first switching circuit is larger than a presupposed value, the first duration signal is configured to shorten the off duration of the first switching circuit and the second duration signal is configured to lengthen the off duration of the second switching circuit.

20. The control method of claim 19, further comprising:

when any one of a signal superposed by the input current feedback signal and the ramp signal, a signal superposed by the battery voltage feedback signal and the ramp signal, a signal superposed by the input voltage feedback signal and the ramp signal, and a signal superposed by the system voltage feedback signal and the ramp signal is larger than a reference signal, the logic integrated signal is configured to be a first condition in order to turn off one of the first switching circuit and the second switching circuit.

* * * * *